March 17, 1970
P. J. HUBBARD
3,500,775
IMPINGEMENT TYPE CYCLONIC REACTOR
Filed July 25, 1968
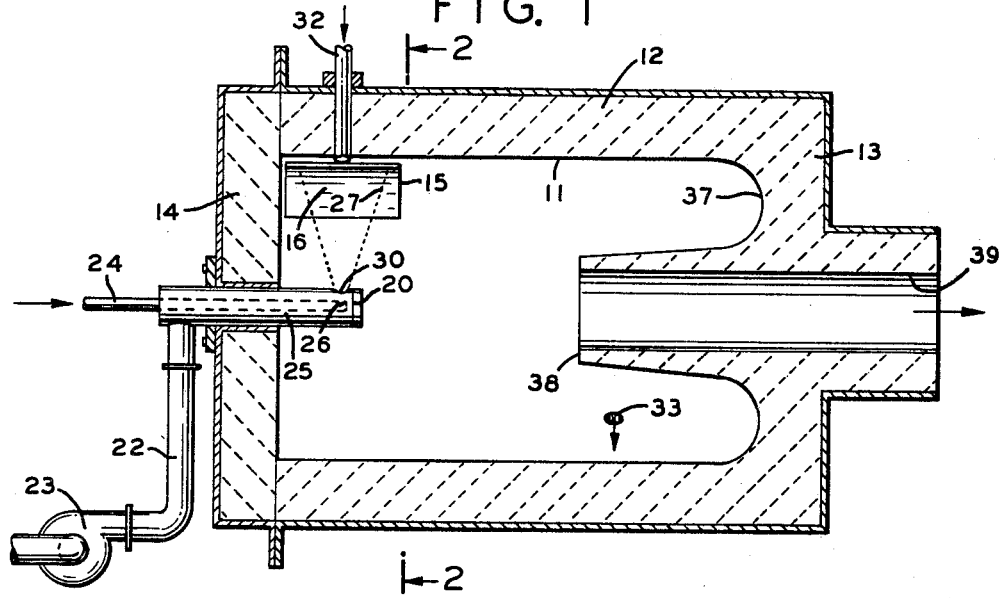
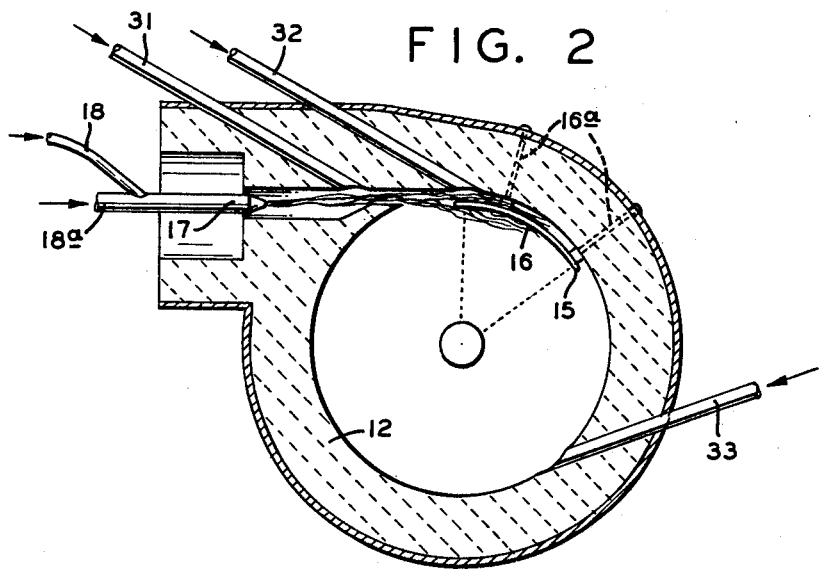
INVENTOR.
PETER J. HUBBARD
BY
George S. Hastings
ATTORNEY.

United States Patent Office 3,500,775
Patented Mar. 17, 1970

3,500,775
IMPINGEMENT TYPE CYCLONIC REACTOR
Peter J. Hubbard, 40 Farbell Road,
Norwalk, Conn. 06850
Filed July 25, 1968, Ser. No. 747,664
Int. Cl. F23g 7/04; F23c 3/00; F23d 11/00
U.S. Cl. 110—8                                      9 Claims

ABSTRACT OF THE DISCLOSURE

A cyclonic reactor having a cylindrical combustion chamber in which a jet flame of burning fuel and combustion air passes tangentially over a smooth heat conducting surface area or pan rendered highly heated and wiped clean by such passage, and a spray device which sprays a stationary pattern of moist waste organic sludge to be treated, against the highly heated surface of the pan, by which the sludge is rapidly dried and bounced off the impingement surface into the combustion chamber for burning.

---

This invention relates to a cyclonic reactor for burning or heat treating flowable material, as for example dewatered sewage sludge or other moist industrial waste. In some aspects this invention constitutes an improvement over my co-pending applications for U.S. Letters Patents now 3,396,680 and 3,396,681, both issued Aug. 13, 1968.

While the cyclonic reactor set forth in the above patents has given good results it has been found possible to improve it in a number of respects. One of these is utilizing the high velocity jet of flame from the oil or gas burner to wipe the surface against which the waste material is sprayed and thus more effectively avoid accumulations of carbonaceous material thereon. By using the hot surface of an impingement plate or pan to receive the spray, which is of an area a little larger than the pattern of the spray, the inner shell cylinder is eliminated. This increases the capacity of the combustion chamber and decreases the cost of the reactor. Because of the small area of the plate and the absence of any thermal expansion problems it is possible to heat the plate considerably higher than the shell disclosed in the above identified applications. With higher temperatures higher velocity of gas is used increasing the capacity of the combustion chamber by increasing the through-put of material. Other advantages and objects are that a simpler and less expensive stationary spray nozzle can be used.

Thus the amount of material that can be handled by the improved combustion chamber is increased in three ways (1) by higher temperatures, (2) by greater gas velocity and (3) by a larger effective chamber volume for the same external size. Also there is less likelihood of buildup of carbonized material on the impingement plate because of the wiping action of the high velocity jet of fuel and combustion air.

Turning now to the drawings, FIGURE 1 is a side elevation on line 11 of FIGURE 2. FIGURE 2 is a cross-section on line 22 of FIGURE 1.

In the drawings, a combustion chamber 11 having a cylindrical refractory wall 12 and end walls 13 and 14 is provided with an impingement plate or pan 15 of refractory conducting material preferably of temperature resistant stainless steel having a cylindrical impingement surface generally parallel to the inner circular wall of the combustion chamber. This impingement plate is slightly spaced from the chamber wall 12, and is secured in position by studs 16a secured through the chamber wall. The gas or oil burner 17 supplied with fuel through pipe 18 and with combustion air under pressure through an air pipe 18a shoots a jet flame consisting of high velocity burning fuel and combustion gases through a tangential aperture which impinges tangentially on the plate 15, thus producing a strong wiping action across the surface of the plate. Part of the jet of burning combustion gases passes into the space between the plate and the chamber wall 12, thus heating the plate on both sides to resist the cooling effect of the impinging sludge. This plate is heated to flame temperatures on the order of 2200 to 2300° F.

A stationary spray device 21 is connected to a source of sewage sludge or other flowable material to be reacted through conduit 22 and pump 23. Compressed air for operating the spray nozzle enters through pipe 24. The sludge is forced under pressure by pump 29 against the end wall 20 of nozzle 25 in front of an aperture 26 in the compressed air pipe, which results in blasting the sludge through opening 30 in a spray pattern as shown at 27 against the smooth surface 15 of the highly heated pan 16. The spray nozzle is, in all respects, similar to that disclosed in the application Ser. No. 619,478 above referred to, except that the nozzle is stationary and, therefore, applies the pattern in a fixed position. The effective surface of the pan 16 is generally co-extensive with the spray pattern impinging on it, plus a safe overlap of the pan with respect to the pattern. The entire area of the pan 16 is wiped by the jet of the fuel burner in order to prevent build-up of carbonaceous or other material on the pan. Also important in avoiding such buildup is the heating of the other or back side of the heat conducting pan which tends to compensate for the cooling effect of the spray on the operating face of the pan.

As a result of the spray of the moist material hitting the highly heated pan 16, steam is formed almost instantly which tends to throw the sprayed material off the pan and the material also tends to bounce back as a result of the inertia effect. The partly dried material is thus thrown back toward the interior of the combustion chamber where the whirling gases resulting from the tangential feed of the fuel and combustion gases causes the material to circle around in the combustion chamber until disintegrated and burned.

As shown in FIGURE 1, the end wall 14 of the chamber is contoured to form a vortex finder, out of which pass exhaust gases and with the gases, the residue of fine ash material. As explained in the above identified patents by varying the length of the vortex finder 38 the detention time of the material within the combustion chamber may be varied. The longer the extent of vortex finder into the chamber, the longer the detention time. During this detention time coarse material or coarse ashes are ground finer for entrainment in the exhaust gases and discharge through exhaust passage 39. By making the vortex finder 28 and thus the detention time sufficiently short, the combustion chamber can be used for drying instead of combustion.

Secondary air vents 31 and 32 are provided respectively adjacent to the inlet for the fuel burner and adjacent to the entrance to the space between the pan 15, and the chamber wall. Other secondary air inlets may be provided adjacent to the oxygen-deficient portions of the chamber, such as shown at 34 near the vortex finder. In order to further promote the spiral circular motion of the burning gases within the combustion chamber, the secondary air inlets are made generally tangential to the inner surface of the circular combustion chamber surface.

By use of the limited area pan 15 having an effective area approximately co-extensive with the spray pattern 36, and wiped by the burner flame, applicant has succeeded in getting the advantages of the inner heated shell of the above identified patents while securing the additional advantages above described. Also because there is no inner cylindrical steel shell it is possible to contour the inner surface of the end wall 13 as shown in FIGURE 1 for more efficient passage of the combustion gases and entrained material.

It is to be understood that the foregoing description and the attached drawings are for purposes of illustration of one preferred embodiment out of a number of different embodiments possible, and that the scope of the invention is to be determined by the annexed claims.

I claim:

1. A cyclonic thermal reactor for moist flowable material having a thermal chamber of circular cross section comprising in combination a refractory impingement surface in said chmaber, a fuel burner directing a jet of burning fuel and combustion gases onto the impingment surface approximately at a tangent to said surface to heat the same and to produce a wiping action on the surface, and a spray device for spraying a pattern of said material against the wiped heated surface at an impingement angle causing heating and rebound of the material away from the surface into the chamber for further thermal reaction.

2. The invention defined in claim 1, in which a pan of heat conducting material spaced from the inner surface of said combustion chamber provides said surface on one face thereof, said fan being arranged to receive a portion of the jet on the opposite face of said pan from said surface.

3. The invention defined in claim 1 in which said impingement surface comprises a curved heat conducting plate consisting of a sector of a cylinder overlapping but generally approximating the extent of the spray pattern, means securing said plate in a position spaced from and substantially parallel to the wall of the combustion chamber, said fuel burner means acting to direct part of the jet between the plate and the combustion chamber wall.

4. The invention defined in claim 1 in which said chamber is cylindrical having said burner and said impingement surface adjacent one end of the cylinder and an exhaust outlet at the other end, means for feeding moist material to be reacted to said spray device, said spray device being arranged to spray a stationary pattern of the moist material in a direction approximately perpendicular to the surface for driving off moisture in the form of steam and causing rebound of the material into the chamber for whirling movement through the chamber and out of the exhaust outlet, during which said material is thermally reacted.

5. A burner for moist waste organic sludge comprising in combination a combustion chamber having a cylindrical wall and end walls, a plate of heat refractory and heat conducting material, means securing said plate approximately parallel to the cylindrical wall with one face of the plate spaced from but adjacent and facing the wall of said chamber and an impingement face facing the central portion of the chamber, a fuel burner directing burning fuel and combustion gases tangentially of the cylindrical wall and over both faces of said plate to heat said plate and impart a circular motion to the combustion gases in the chamber and a device for feeding the moist sludge in a generally radial direction to impinge on the plate.

6. The invention defined in claim 5 in which one of said end walls is provided with an exhaust opening, and a vortex finder extending internally of said wall for controlling detention time of the sludge rebounding from said plate in the combustion chamber the interior face of the end wall between the vortex finder and the cylindrical wall being contoured to a concave toroidal shape to facilitate movement of gases and burned sludge being exhausted.

7. The method of burning moist organic material in a combustion chamber having end walls and a cylindrical wall connecting the end walls which comprises directing a jet of burning fuel and combustion gases into said chamber tangentially of the cylindrical wall to cause whirling action of the combustion gases, providing a refractory surface in said chamber extending in the direction of movement of the gases of the jet in a position to be swept by said jet to heat said surface and wipe the surface to avoid accumulation of material thereon, and spraying said material forcibly against said swept surface at an impingement angle to said surface to driving off steam and cause the material to rebound toward the interior of the chamber for further drying in the whirling gases.

8. The invention defined in claim 7 in which the material is sprayed in a direction approximately perpendicular to said surface.

9. The method of rapid drying of moist sprayable material which comprises providing a chamber and a jet of burning fuel and combustion gases in said chamber, supporting a plate of refractory heat conducting material within said jet with its plane extending in the direction of movement of the combustion gases of the jet with the jet sweeping over at least one face with a wiping action to avoid accumulation of carbonaceous material on its plate and spraying said moist material against said swept face, substantially in a direction approximately perpendicular to said surface whereby steam is driven off and the material rebounds from the plate for further drying in the chamber in the hot gases produced by the jet.

References Cited

UNITED STATES PATENTS

| | | | |
|---|---|---|---|
| 2,566,731 | 9/1951 | Komline | 110—8 |
| 3,199,476 | 8/1965 | Nettel | 110—28 |
| 3,396,680 | 8/1968 | Hubbard | 110—8 |

KENNETH W. SPRAGUE, Primary Examiner

U.S. Cl. X.R.

110—28